No. 896,594. PATENTED AUG. 18, 1908.
C. M. SMITH.
APPARATUS FOR THE MANUFACTURE OF ICE.
APPLICATION FILED MAY 2, 1907.
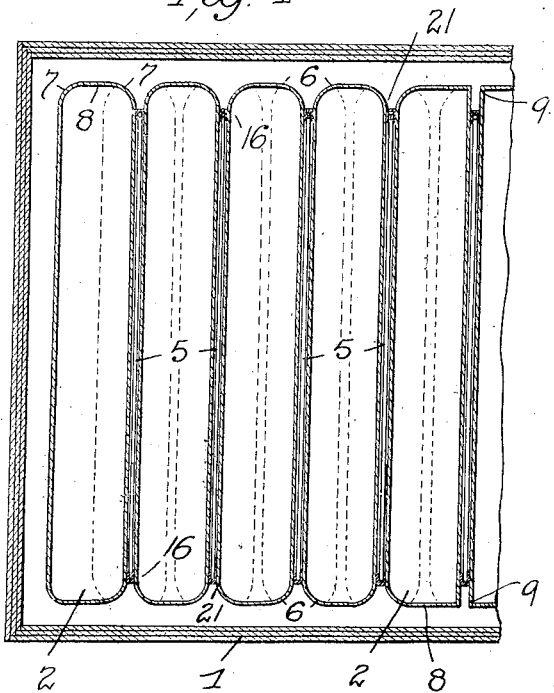
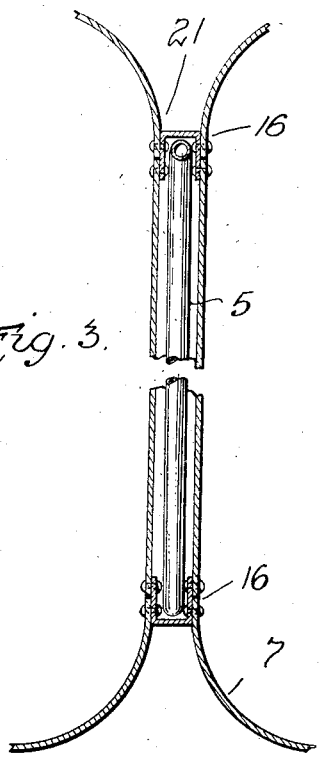
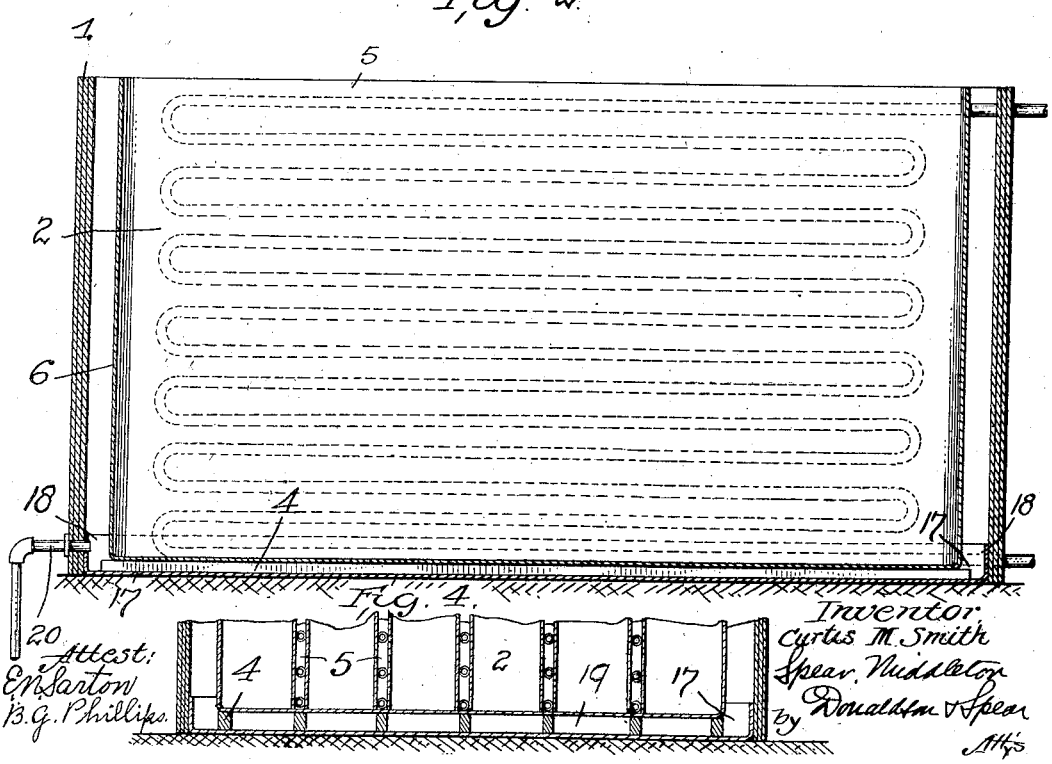

UNITED STATES PATENT OFFICE.

CURTIS M. SMITH, OF WASHINGTON, DISTRICT OF COLUMBIA.

APPARATUS FOR THE MANUFACTURE OF ICE.

No. 896,594.  Specification of Letters Patent.  Patented Aug. 18, 1908.

Application filed May 2, 1907. Serial No. 371,493.

*To all whom it may concern:*

Be it known that I, CURTIS M. SMITH, citizen of the United States, residing at Washington, District of Columbia, have invented certain new and useful Improvements in Apparatus for the Manufacture of Ice, of which the following is a specification.

My invention relates to the manufacture of ice and to that form of apparatus which is employed for making plate ice. I aim to provide an apparatus which will facilitate the ready removal of the cakes of ice from the tank or chambers without breaking or destroying any portions of the same. In ice plants of this type, as at present constructed, the freezing plates are of the length corresponding to the width from side to side of the tank, and their ends and the walls of the tank against which they abut are in substantially the same vertical plane. In an apparatus of this construction the ice is formed on the sides of the freezing plates and as the freezing process goes on the two cakes of ice will become united at their ends adjacent the wall of the tank and much difficulty is experienced by reason of the juncture of the cakes of ice at these points. The joining of the cakes of ice at this point makes it difficult to remove the said cakes, and furthermore a tank of this construction renders it difficult to free the ice cakes from the walls of the tank.

I aim to provide means whereby the bridging of the space between the cakes of ice at the ends thereof will be avoided so that these cakes will remain separate and distinct from each other, and I also aim to provide a structure which will facilitate the loosening of the ice cakes from the walls of the freezing chamber so that the cakes may be readily removed.

The invention consists in the features and combination and arrangement of parts hereinafter described and particularly pointed out in the claims.

In the accompanying drawings, Figure 1 is a plan view of a portion of the apparatus as made by me. Fig. 2 is a vertical sectional view of a part of the said apparatus. Figs. 3 and 4 are detail views.

In these drawings the outer wall of the tank 1 may be composed of wood or other material having an insulating character and within the space inclosed by these walls the freezing chambers 2 are located, these being supported at a slight distance away from the walls 1 of the tank or apparatus and being also blocked up from the bottom, the blocks or strips 4 being located between the bottoms of the freezing chambers and the foundation or bottom of the main tank or chamber of the apparatus. The freezing chambers are made up of the plates or cells 5, which are arranged parallel with each other and at a distance apart and are connected by the walls 6 also forming parts of the said freezing chambers. The cells or plates 5 do not differ in themselves from those now known and are provided with coils of pipe through which the freezing medium is circulated. The walls 6 of the freezing chamber and their relation to the cells or plates 5 are specially constructed and arranged by me to secure the improved result sought for. These walls therefore instead of extending directly from one cell or freezing plate to the other and in the same plane as the ends of said cells or plates are extended beyond the ends of the said cells or plates 5 as shown in Fig. 1, so as to provide lateral extensions of the chambers in which the ice is formed. For this purpose, as shown in Fig. 3, the side walls of the freezing chamber are curved laterally from the ends of the cells or plates 5, the curved portion 7 merging into and being connected by the straight end walls 8. As shown at 9 the corners of the ice chambers instead of being rounded may be right angular.

The bridging of the space between the ice cakes at the ends of the freezing chambers when constructed as heretofore with the end walls extending directly from one cell to the other substantially in the plane of the ends of the cells is due as I believe to the fact that the abstraction of heat goes on more rapidly along the line of the wall of the chamber from any given point of the cell than it does on lines radiating from this point into the freezing chamber, the metal of the wall being a better conductor of heat than the water to be frozen, and at the ends of the cells where the wall extends directly across from cell to cell the heat is more rapidly abstracted than at points on the interior of the freezing chamber because this end wall is within the radius of influence of the end of the cell and provides a good conductor for the abstraction of heat thus causing the transverse bridge build up. In my improvement however, the end wall is extended beyond the end of the cell and while the longitudinally extended part of the wall is within the zone of influence of the end of the cell and the heat is abstracted along this extension the transverse portion being removed from the influence of the end of the cell will not act as a conductor to abstract sufficient heat from the water lying against it to cause the ice to form here and consequently the ice will not build up on this transverse portion.

I do not limit myself to any particular means of applying a thawing temperature to the exposed corner of the ice chamber.

Furthermore, by means of the laterally extended walls of the freezing chambers beyond the terminal points of congelation of the cells or freezing plates I am enabled more readily to loosen the ice cakes from the walls of the chamber and from the freezing cells by the use of water or other medium circulated between the outside of the freezing chambers and the outer wall 1 of the tank or apparatus. For by these laterally extending ends of the freezing chambers the ends of the ice cakes are brought more fully under the influence of the thawing or loosening medium which not only circulates adjacent the extreme end face of the ice cake but around the corner thereof.

At the bottom of the apparatus I provide a pan or tray of metal or other suitable material 17, having upwardly extending walls forming a rim 18 lying close against the outer insulating wall 1. The blocks or strips 4 rest upon this tray or pan, thus providing spaces 19 between the pan and the bottom of the freezing chamber for the circulation of the fluid intended to loosen the ice cakes. This fluid after passing down along the ends of the freezing chambers flows beneath the same, through the spaces 19 and from the pan or tray this fluid is discharged at any suitable point as at 20. The pan or tray may rest upon the foundation upon which the ice plant is supported and in effect it forms the bottom of the chamber which is bounded by the insulating walls 1. It will be also observed that the lateral extending ends of the freezing chambers provides channels or passages at 21 intermediate of the extended ends of adjacent freezing chambers for the circulation of the loosening medium.

Where in the appended claims I refer to the terminal point of the freezing cells or to the walls extending out beyond the freezing cells I refer to the construction in which the walls of the freezing cells extend beyond the point at which congelation takes place.

I claim as my invention:—

1. In an ice making plant, freezing chambers comprising the freezing cells upon which the plate ice is to be formed, and the walls extending beyond the terminal point of the freezing cells, said walls extending between the said freezing cells and closing the ends of the freezing chambers and means whereby a thawing medium may be circulated against the exterior sides of the extended walls and outside of the freezing cells and chambers, substantially as described.

2. In combination the tank, the freezing chambers comprising the cells and the walls extending between them closing the ends of the freezing chambers and lying beyond the terminal points of said cells, the outer wall of the tank being arranged with a space between the same and the walls first mentioned for the circulation of a thawing medium on the exterior of said walls and outside of the freezing cells and chambers, substantially as described.

3. In combination, a plurality of freezing cells spaced apart and having walls extended out beyond the freezing cells and forming the ends of the freezing chambers, the extended walls of adjacent chambers having a channel or space between them at the ends of the said freezing cells, and an outer tank spaced from the extended walls, the said channels and the space between the extended walls of the freezing chambers and the outer tank being adapted to receive a circulating medium to loosen the ice cakes, substantially as described.

In testimony whereof, I affix my signature in presence of two witnesses.

CURTIS M. SMITH.

Witnesses:
S. A. TERRY,
WALTER DONALDSON.